United States Patent [19]
Lux et al.

[11] Patent Number: 5,136,297
[45] Date of Patent: Aug. 4, 1992

[54] METHOD FOR NAVIGATION AND UPDATING OF NAVIGATION FOR AIRCRAFT

[75] Inventors: Peter Lux, Langenargen; Max Eibert, Friedrichshafen; Gerhard Kannamueller, Markdorf, all of Fed. Rep. of Germany

[73] Assignee: Dornier Luftfahrt GmbH, Fed. Rep. of Germany

[21] Appl. No.: 621,521

[22] Filed: Dec. 3, 1990

[30] Foreign Application Priority Data

Dec. 1, 1989 [DE] Fed. Rep. of Germany ....... 3939731

[51] Int. Cl.$^5$ ............................................. G06F 15/50
[52] U.S. Cl. ........................................ 342/64; 342/33
[58] Field of Search .................................. 342/33.64

[56] References Cited

U.S. PATENT DOCUMENTS

| | | |
|---|---|---|
| 3,472,469 | 10/1969 | Evans et al. |
| 4,910,674 | 3/1990 | Lerche ............................ 342/64 X |
| 4,939,663 | 7/1990 | Baird ............................. 342/64 X |

*Primary Examiner*—Mark Hellner
*Attorney, Agent, or Firm*—R. H. Siegemund

[57] ABSTRACT

A method of using a method for navigating and updating of navigation for aircract under utilization of sensor image processing and reference store data, for purposes of automatic or assisted landing is disclosed.

7 Claims, 5 Drawing Sheets

METHOD FOR NAVIGATION AND UPDATING OF NAVIGATION FOR AIRCRAFT

BACKGROUND OF THE INVENTION

The present invention relates to autonomous landing system for landing or assisting the landing of aircraft under utilization of navigational devices, equipments and systems and more particularly the invention relates to a new use of methods and equipment as proposed by some of use and another, as per the applications of common assignee Ser. No. 523,130, filed May 14, 1990, Ser. No. 523,131, filed May 14, 1990, now respectively U.S. Pat. Nos. 5,087,916 and 5,047,777. The content of these applications is incoporated by reference to its entirety in this application.

Automatically operated landing system for aircraft are known by and in themselves and have been introduced into the practice of operating aircraft. The otherwise known systems are based on position measurement under utilization of electromagnetic waves and are known e.g. under the designation of instrument landing systems (ILS) or the so called microwave landing systems (MLS). These systems require certain infrastructural devices, i.e. ground based features and equipment and facilities in or near the respective airports including particularly transmitters and receivers.

An autonomous system as far as the aircraft in general is concerned and concerning the on-board equipment in particular must meet two requirements. In other words, the basic requirement can be divided in two aspects. First of all, one needs a system for extremely accurately measuring the three spatial coordinates, for example cartesian coordinates x,y,z with reference to a coordinate system based in and at the point of landing. On the other hand one needs an on-board computing facility which calculates the approach trajectory on the basis of aircraft performance, its features and characteristics and under consideration of safety factors of involving the particular craft and being further related to particulars such as the geographic and weather situation of the landing site. The on-board computer calculates the steps to be taken as far as controlling the aircraft is concerned and provides the requisite signals for the control of actuators for the rudders, electrodes etc. Aircraft which do not provide for automatic landing use of course the pilot's skill in this regard. It is practical to consider the pilot as a "man in the loop" in that he or she receives a significant amount of information as landing assist. Here of course it is particularly desirable to provide the pilot as accurately as possibly with objective data concerning the position of the craft, over and beyond his ability to see the approaching landing site.

DESCRIPTION OF THE INVENTION

It is an object of the present invention to provide a new and improved autonomous landing system for aircraft with increasing accuracy as far as positioning the craft is concerned or at least as far as providing landing assist to a pilot on the basis of accurate knowledge of the locality involved in order to make sure that the landing is carried out as safely as possible.

In accordance with the preferred embodiment of the present invention it is suggested to provide a coupling with a navigational system specifically an automatic landing system is proposed which on approach of the runway takes over the landing and approach which operation is automatically instituted or at least recognized as landing assist in case of an instrument based but otherwise manual landing operation. In the latter case the pilot will receive the indications concerning actions to be taken and the pilot is then charged with taking over the flight and control of the plane for landing in accordance with the indicated information. It is particularly proposed to use the navigational methods and system which are the subject of the said two applications.

As far as Ser. No. 523,130 (supra) is concerned, the system and method of that application takes automatically range images of the ground underneath in a line for line scan suitable objects are selected, recognized, and their position in the image field is compared with reference information. In this configuration the system can be used not only for the evaluation of range images but normal images i.e. images with image points are whose contrast corresponding to the relative amount and quantity or intensity of light being reflected. In a further configuration and in addition to the segmentization and feature extraction the unit may be provided for image correction. This is needed in the case of low altitudes and involving the geometric error resulting from the transverse, fanlike scanning procedure; it requires a "fan correction" and in addition position error corrections are needed. Here the feature extraction includes a search for particular types and "signatures" of objects such as houses, forests, streets, bridges or the like. The search for particular kinds or types of objects may be carried out automatically with reference to these objects (to the exclusion of others) if on the basis of the reference information one or the other particular kind of object is to be expected. The position determination may be carried out in addition through identification of individual objects or groups of objects whereby then it is determined whether there is agreement between the thus identified particular object or group of objects on one hand with regard to the position such objects or groups of objects are supposed to have on the basis of the reference information. This kind of evaluation depending on the position of the craft may be carried out automatically on the basis of the reference information that is available on board. In a further embodiment a hierarchical method for object segmentation such as an S-transformation can be done in accordance with the "Archives of the electronic and transmission engineering", volume 31, pp. 267-274.

Another method of navigation in accordance with the inventive landing system uses equipment in accordance with Ser. No. 523,131. In accordance with that particular application a radar or laser radar measuring system is used to acquire linear altitude data of a path in the territorial of overflight. The profiles are processed through suitable evaluation procedure to distinguish between e.g. forests, areas with houses and certain particular objects of a unique nature such as specific rivers and so forth. By adding the amplitude of the reflected signals one has a further feature available for identifying particular features; because the features based on geometry alone may lead in some cases to certain doubts or ambiguities. After a particular strip has been segmentized and if necessary corrected by means of otherwise available aircraft data a comparison is made with stored reference information. This includes again topographical information of the ground including elevational changes in regard of buildings and particular plant growth. This information is generally acquirable from maps or aerial photos and is stored accordingly. The comparison with the data as it is acquired during overflight with reference information deemed relevant results in the determination of the position of the craft and updates the navigational unit of the craft.

Owing to the fact that a INS system is usually already present in aircrafts of various kinds cooperating with a computer for dead reckoning navigation the position of measuring points is calculated therewith and the system operates in a very short period of time so that the speed and position of the craft is recognizable therewith. The navigation of Ser. No. 523,131 uses a one dimensional profile and is thus simpler as compared with the two dimensional scan of the detailed and the more accurate method as per Ser. No. 523,130. In the navigation with a single dimensional profile particularly in the case of using a radar with a relatively poor local resolution such as radar altitude measurements one uses or tries to use redundancy in the measurement to avoid ambiguities.

Furtherance of this approach, the landing path may be identified at a certain distance of the location of the landing strip and runway through auxiliary structures uniquely identifiable through a kind of auxiliary signatures which then permits very accurate determination of the lateral position. Considering that the approach in general is usually somewhat inaccurate, then on flying over these features somewhat ahead of the landing strip, increases drastically the lateral positioning accuracy, so that for the subsequent final approach the INS accuracy of the landing system is indeed sufficient. The altitude measurement is continuously carried out through radar or laser radar. Auxiliary structures within this context can be basically geometrically unique and unambiguous objects such as particular combinations of posts, beams long boards or rods and having a suitable overall structure can be use to be recognizable by means of radar or by way of very distinct reflection pattern or by way of range information. In the case of optical methods these auxiliary structures should be recognizable additionally on the basis of contrasts. In other words they should be unambiguously distinguished from the background. In the case of range measurement the structures should produce a noticeable elevational jump above ground. This way unambiguous positional information will be provided on overflight under utilization of the directional flight which is provided by the INS system in a very high degree of accuracy.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Proceeding now to the detailed description of the drawings, FIG. 1 illustrates a block diagram of equipment by means of which navigation is carried out. Herein is provided a sensor SN image correction BK which receives the flight position data from the equipment generally identified by FD. Reference character SG refers to a segmentation unit with output fed to a feature extraction unit ME which in turn feeds its information to a feature comparison unit MV. These units all receive data from a reference source RSP. Further details of this arrangement and device are disclosed in the above identified application whose content is incorporated by reference herein.

Figure 1:
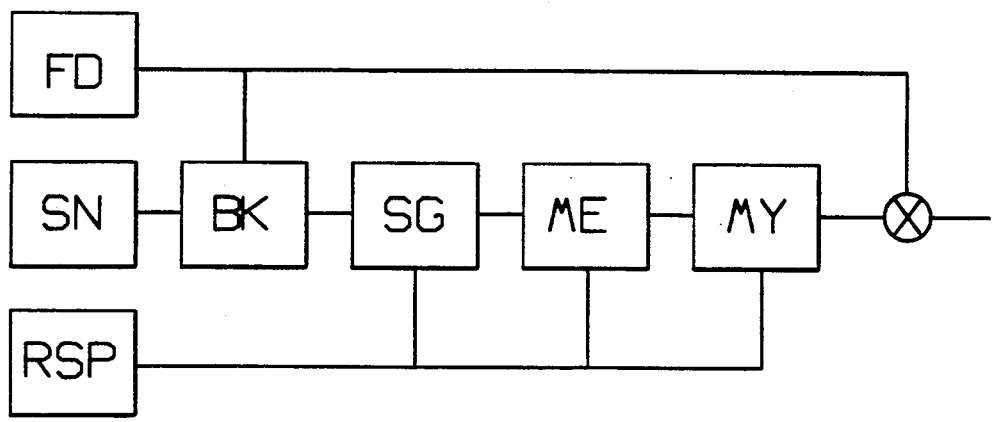
FIG. 1 is a block diagram of a navigational system used in accordance with the preferred embodiment of the present invention, and is applicable to both kinds of methods as per Ser. No. 523,130 and Ser. No. 523,131.

The equipment as shown operates as follows. As stated, sensor Ser. No. scans and provides an image of the territorial overflight in a line for line fashion as indicated broadly in FIG. 2. The image correction unit BK corrects for the geometric distortion resulting from the fanlike scanning and eliminates the scanning error on the basis of the angle the scanning beam has vis-a-vis the vertical. As a consequence an image is produced that is no longer distorted. The other stages process the recognition of objects usable for purposes of navigation such as individual distinctive buildings, kinds/groups of buildings, groups of trees, small or medium size forests but also individual trees, dams, streets, bridges, railroad tracks and so forth. The processing has been called segmentation and extracts these features on the basis of various feature elements in the above identified application using this segmentation unit SG.

Here then attributes and signature defining features are determined in order to find item or object characterizing features to permit classification of the objects including position orientation and length of the limiting vectors, height, volume, moments, axes of inertia, shape parameters, position of geometric centers, center of gravity, certain boundary points and so forth. All these features are extracted from these recognized objects by means of the feature extraction unit ME. The comparison unit ME determines whether or not the sequence of these features in the overflight image path, essentially agrees with features found somewhere in the reference store. The comparison is made on a statistical basis. From the position of feature-identifiable objects in the image, a processing device relates that information to reference position. Here a set of flight updating data is obtained for correcting the navigation proper of the craft.

The determination and calculation of the features is carried out prior to the flight either manually or in an interactive fashion automatically with regard to certain reference planning stations. The reference information can be extracted from maps, aerial photos, satellite photos or from other information sources available in digital form such as the digital land mass system. This preparation is a preliminary step by means of which the territory of overflight is selected generally and certain identifiable objects are identified and particularly weighted in terms of importance. As stated features are all properties of objects which can in fact be ascertained by means of a range finding and contrast producing sensor and are therefore extractable on one hand from the reference material but on the other hand can be ascertained by means of the measuring equipment during overflight from the particular territory involved. Moreover, there must be a certain degree of sufficiency concerning the repetitiveness of certain features. The sensor may basically be provided as stated as a system for range finding images or a combination of range finding and reflection imaging device.

Figure 2:
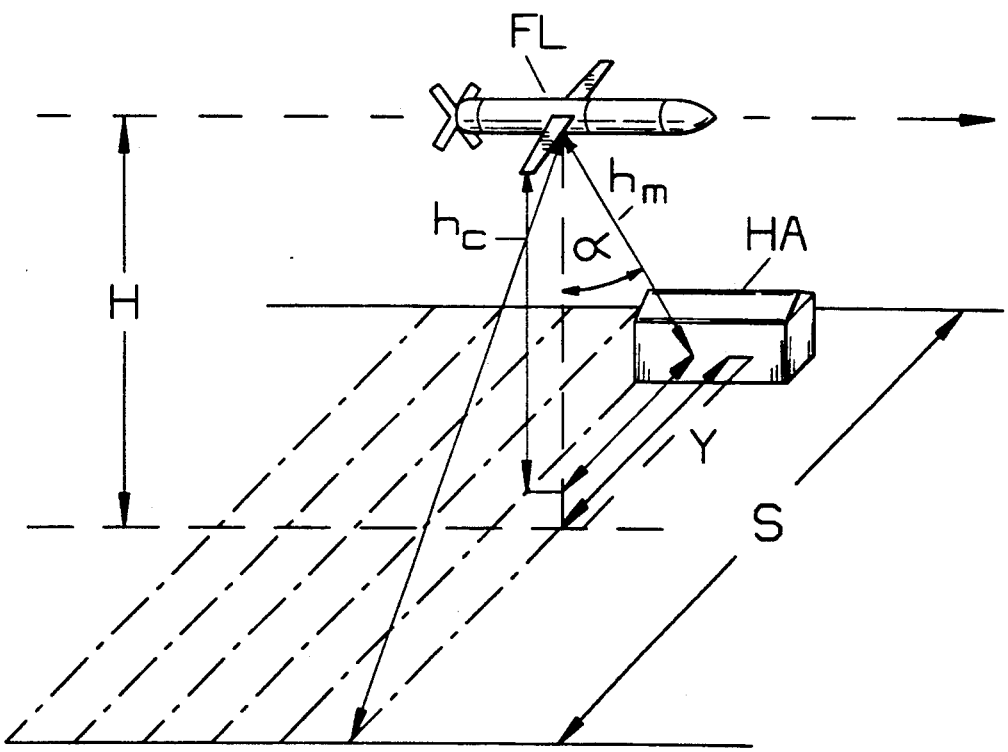
FIG. 2 illustrates the scan in a transverse direction during overflight for acquiring altitude data in range imaging process, using the system and method as per Ser. No. 523,130.

Proceeding to further details of FIG. 2 it shows an aircraft or flight vehicle FL being equipped with the inventive navigational equipment. It possesses a sensor which scans in any instant a range strip of the width S whereby the territory of overflight covers that width S by a scanning through an angle of + and − alpha with respect to normal or vertical. The scanning obtains line for line with the on board scanner providing the line scanning proper and the moving craft provides for the progression from line to line. This aircraft transmits e.g. laser light and in the direction and response to the reflected light. The response is normally by means of determining the transit time that elapses between the transmission of a particular wave and the reflective return thereof which of course is a range information. The reflection intensity can be separately used in order to provide normal reflection image information. On the basis of transit time and angle of scanning one can therefore establish a range image of the territorial overflight being a strip of the width S.

Figure 3:
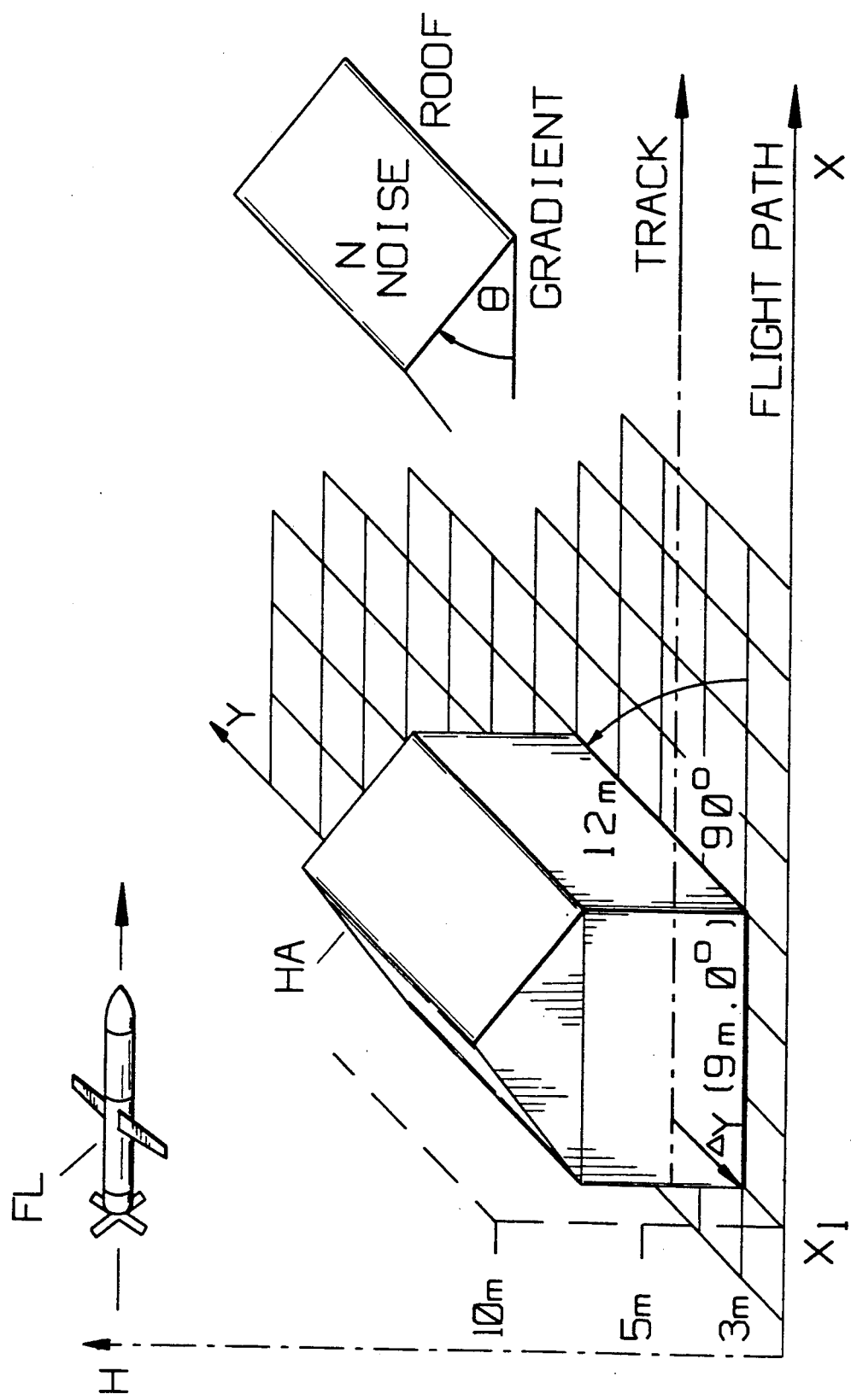
FIG. 3 is a representative example of an object that is being scanned.

The figure in addition shows the height H of the flight and the specific distance of the craft hm from a particular object HA. The length vector Y denotes the distance of that object i.e. of the house HA from the center line S of the flight path. hc is equal to H and denotes specifically the distance of the craft from the center line. FIG. 3 illustrates this house HA in a somewhat greater detail and assumes that the characterizing features are the position of the house and the dimensional and delineating features characterizing that house e.g. by its elevational boundaries which information is stored in the reference store of the craft e.g. in terms of coordinate values delineating the ground elevation of that house. This information is acquired indirectly on overflight from the vectorial distance information hm which is provided pursuant to the scanning operation as defined. The plurality of information hm can be extracted from the depth information (angle and transit time) and is in fact useful for comparison with the reference information that identifies the particular house HA. In other words, the range image that is being constructed from the scanning operation with utilization of various distance vectors hm on one hand can be compared with a reference information on the basis of the local information including particularly the local resolution of the stored information, using the segmentation method mentioned earlier and described in greater detail in the copending applications, particularly application Ser. No. 523,130.

Figure 4:
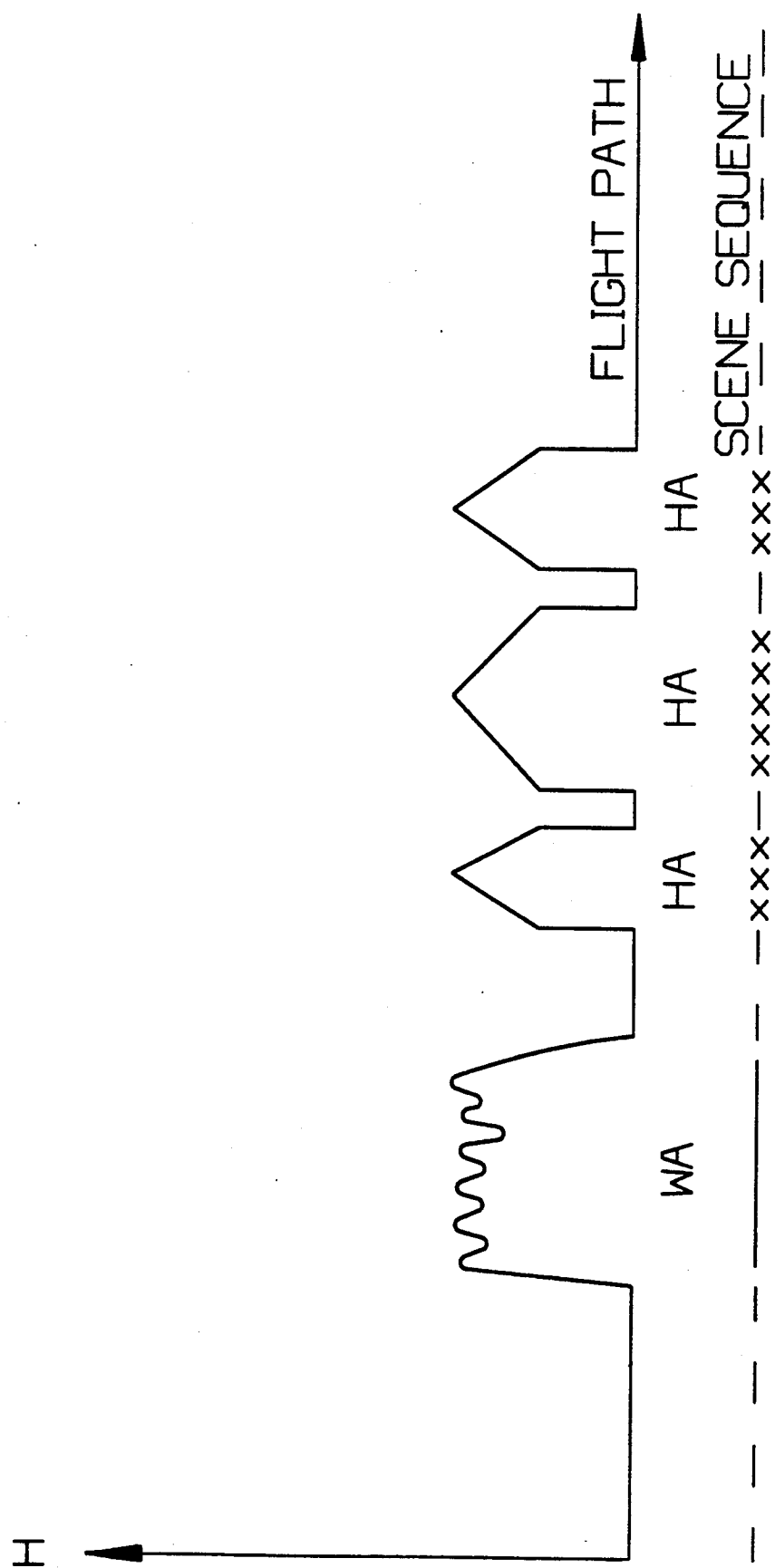
FIG. 4 is a linear altitude profile as per the method and system of Ser. No. 523,131.

The basic difference of the arrangement in accordance Ser. No. 523,130 as compared with the information in Ser. No. 523,131 is that the latter uses such a more or less one dimensional strip of the territory of overflight by the craft is processed. The basic method of processing data however is similar in both instances so that the block diagrams per FIG. 1 is applicable to both methods. Turning now to FIG. 4, it shows a scanned altitude profile resulting from a particular one dimensional scan and processing. The profile is elevational information varying in the vertical on overflight in the horizontal direction. It is assumed that there is a forest WA and a group of houses HA. The altitude radar information yields a plot as shown in FIG. 4.

Figure 5:
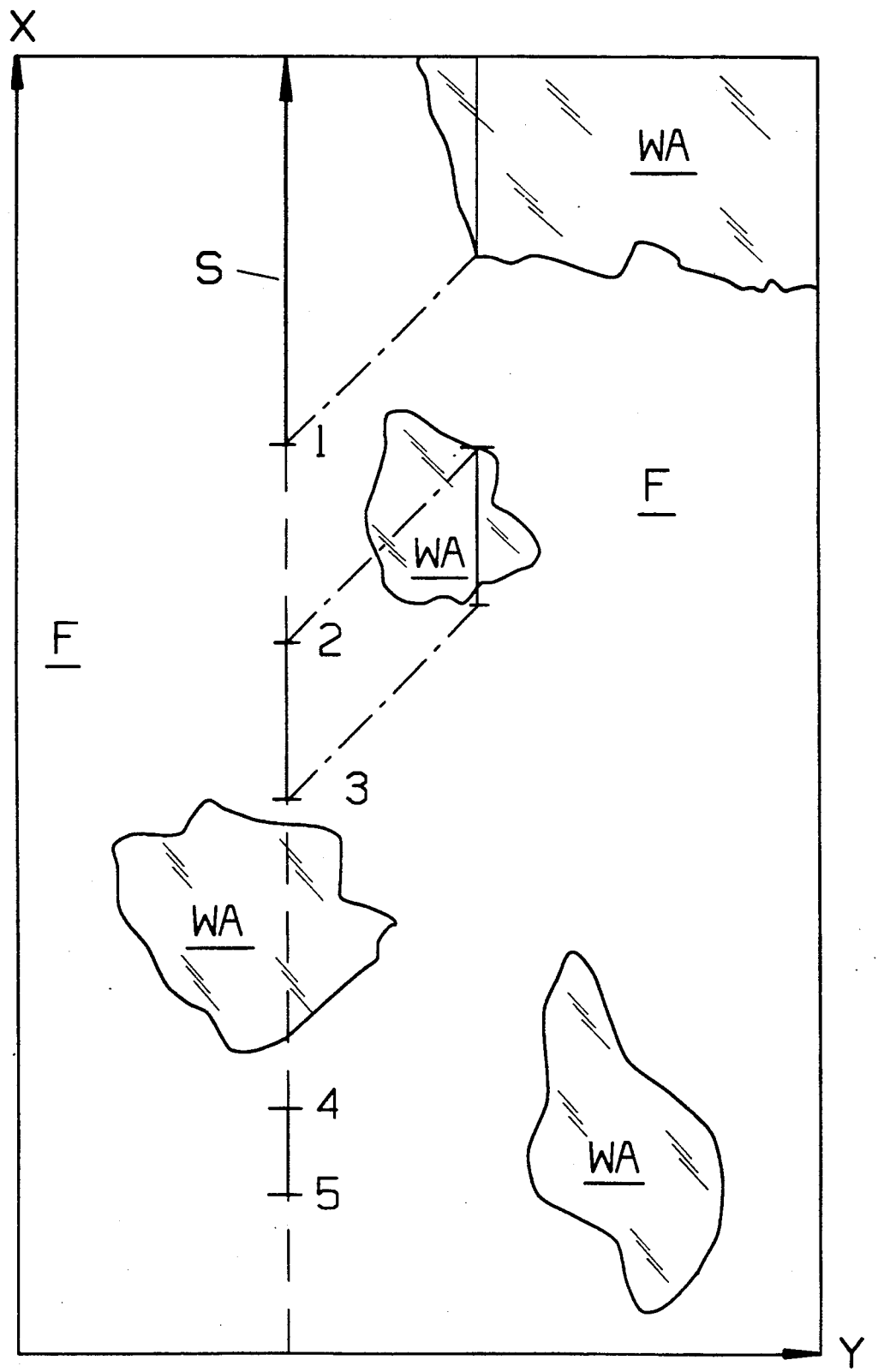
FIG. 5 shows a reference area with overflight path also for linear altitude profile.

FIG. 5 shows how this particular feature and kind of information can be processed. In fact it shows a variant method in the comparison particularly as it is carried out by the comparison unit MV in this case. FIG. 5 shows a map in elevational view with coordinate x taken to be in the direction of flight and y being transverse thereto, both taken in the horizontal. The map shows a contour pattern as it is stored in the particular craft in the particular store of the craft under observation and identification of what these particular delineated areas are. In other words, the stored information encompasses the geometry of delineating certain areas and domains together with indexical information as to what these areas and domains mean and what the typical signatures are as far as these areas are concerned, such as more or less random elevational variations means "forest" while regular variations mean "houses".

In the example of FIG. 5 the particular irregular domains are in some form identified as forests in the stored information. The line S is an assumed overflight path is a strip having a particular width which is neglected in this case but which is minimal and it is only important that the altitude information is as the overflight occurs. The solid portions of line S indicate "forest", by the processing of the imaging equipment forest and the dotted line portions are assumed to be "field".

It can be seen that the dotted pattern does not agree with the map information upon which flight path S has been superimposed since one particular forest WA is more to the left in the Figure and is traversed by a dotted line which as far as measurement is concerned supposedly indicates "field". On the other hand it can be seen that the forest information would fit if there were a transposition along the dash dot line. In other words using the information as it is in the reference data field there is a kind of best fit of the overflight scene along path 5 which indicates the deviation of the actual course from the assumed course.

Decisive for the recognition of measured and segmentized sections is the transition from one kind of ground information to other kind. For example transitions between forest and field or between water and surrounding land, streets and areas etc. In this case here the transitions are marked with the transition 1, 3, 5 which as far as the actual flight path and measured profile is concerned being forest to field transitions, while 2 and 4 are field-to-forest transitions. These transitions result from the subject to the measurement and are acquired and extracted from the measured data. They are basically, the boundaries of particular signature patterns "field", "forest", "houses" as the case may be some domains being identified by "no height variations", "random height variations" and "regular height variations". Hence a field-to-forest transition is marked by the onset of irregular height variations after a period of no height variations. Analogous, boundary information is extractable from the map and reference information. These are then characterizing features the occurrence of which and in geometric fashion is used for comparison purposes.

The calculation simply carried out in whatever transition pattern is ascertained along the flight path 5 and by an appropriate algorithm in the on board computer. The flight path S is shifted in the y direction for purposes of comparison with the reference data and also shifted in the x direction until a best fit obtains. That shift is indicated by the dash dot line in FIG. 5 and is deemed to constite a best fit. The best fit is, of course, given by a statistical information namely by the fact that the deviation of the existing pattern as per the overflight data from reference pattern is minimized. One can use here for example the mean absolute difference (linear) or the mean square difference (quadratic) or both which is not essential in principle.

The method is, moreover, not restricted to any requirement that line 5 be a straight line; a curved path of course can equally be used. Since a craft "knows" when it is flying straight or in a curved path the extraction of the reference information for purposes of comparison is modified accordingly.

The aircraft equipped with a linear system of the kind described can approach either an air field that has naturally distinguishing features or with comparatively little expenditure can be modified to be so identifiable. Also emergency landing strips including high ways or the like can be identified in that fashion. This means particularly that even without landing lights the craft can automatically land which in turn means that landing is possible during night and day and the equipment is easily installable in relatively small transport aircrafts using relatively small landing fields and short runways.

Figure 6:
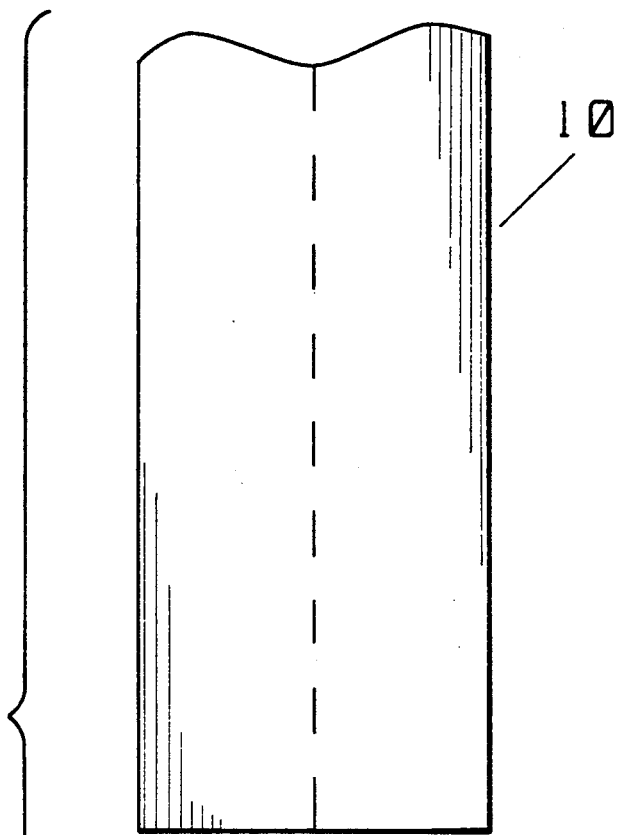
FIG. 6 is a schematic view of a runway with local navigational assist structure.
Figure 6:
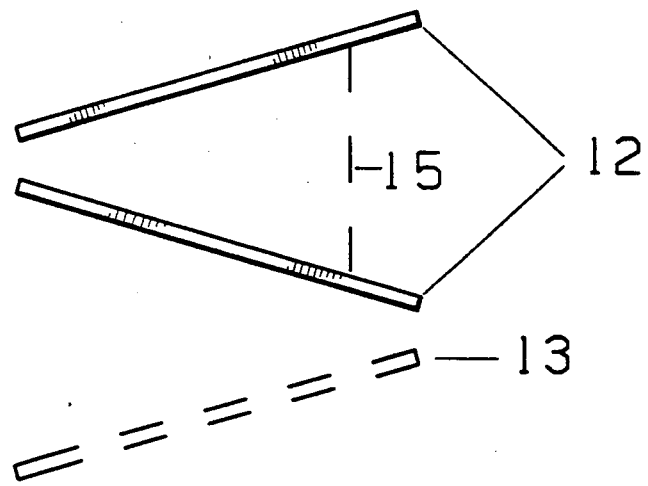

A radar navigational system results in a great degree of independence from weather conditions including particularly haze or even fog. In the case of military employment the airfield can be completely unilluminated and it is not necessary to turn on any local transmitter. The runway is in fact very difficult to be detected. ILS or MLS system, contrary to the equipment in accordance with the invention, are much more expensive so that the ILS and MLS systems are usable only in large airfields and airports. An approach position determination in a "featureless" environment is now explained more fully in furtherance of the invention with reference to FIG. 6 wherein reference numeral 10 includes a schematic landing strip and runway and reference numeral 12 is a auxiliary structure such as a pair of obliquely positioned beams which owing to their particular inclined orientation (in the horizontal) they do not extend in parallel to each other transverse to the normal approach of an aircraft. Reference numeral 13 refers to a redundant auxiliary structure, simply for enhancing accuracy and safety.

Figure 6A:
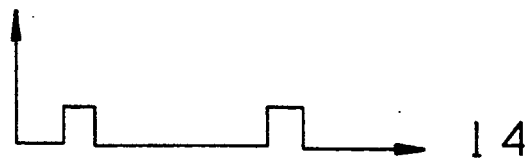
FIG. 6a is pulse diagram acquired on approach of the runway shown in FIG. 6, by means of a method and system as per Ser. No. 523,131.

FIG. 6a shows that a particular altitude profile is gained by overflight as the craft approaches this landing strip 10. From the two vertical excursions in the profile one can determine exactly where the two beams will cross. Reference numeral 15 illustrates the actual overflight location and that of course gives an indication how far the craft has strayed from a dead center approach of the landing strip 10. In particular the auxiliar structure 12 will be recognized from the altitude profile 14 as per FIG. 6a because these auxiliary structures 12 yield a very clearly identifiable signal and it is assumed that nothing near the approach path of the aircraft could falsify the measuring result and simulate a profile excursion which is not unambiguously related to the approach path. The temporal processing of the signals of course, taken in conjunction with the instantaneous speed of the craft, permits indeed a very accurate unambiguous determination of the lateral position of the craft vis-a-vis a correct approach path. As stated the auxiliary structure 13 is a redundant feature and simply serves to increase the safety and to avoid the possible effect of glitches.

It should be realized that the illustration is schematic only, the particular structures 12 and 13 and so forth are not drawn to scale as far as the distance from the runway as concerned. The distance may be several kilometers such as 3 to 4 km from the auxiliary structures 12. On the other hand the orientation in terms of elevation can be deemed to be accurate to scale. In addition of course one could use the amplitude of the reflected signal e.g. the reflection from the beams as they may be very dark as compared with the background and additional processing of the amplitude of the reflected light can give additional indication that indeed these signal excursions result from reflection at the beams. As stated of course it can be seen that the laser radar system has the advantage of a very little dependency on weather.

The invention is not limited to the embodiments described above but all changes and modifications thereof, not constituting departures from the spirit and scope of the invention, are intended to be included.

I claim:

1. Method of using a method for navigation and updating of navigation for aircraft under utilization of sensor image processing and a reference store data, for purposes of automatic or assisted landing comprising the steps of:

using a scanning sensor including a circuit to obtain a two dimensional range image of a portion of overflight territory, the image being composed of image points, each being represented by a brightness value corresponding to the distance of the craft from the respective territory point represented by the respective image point;

segmentizing the image data in order to obtain an areal pattern of type features of and within and as part of the image for purposes of classifying particular types of objects across which the craft flies in terms of range/brightness information and relation between such information as between neighboring image points in transverse direction as well as in the direction of flight;

extracting from the segmentized data particular signature features including localized elevational jumps; and determining from the particular signature features the position of the craft by correlating a plurality of features and their spatial orientation to each other as extracted with corresponding stored reference information in order to provide a maximum fit that is indicative of deviation of the flight from a flight path as identified by the reference information.

2. Method as in claim 1, including parallel evaluation of reflection images.

3. Method of using an apparatus for navigation and updating of navigation for aircraft under utilization of sensor image processing and a reference store, for landing or landing assist comprising:

using a scanning sensor including a circuit to obtain a linear range image of a portion of overflight territory;

segmentizing the image data by detecting elevational scanning patterns to persist over certain lengths of scanning and by detecting boundaries of these data patterns, different elevational patterns differ by changes in average elevation and by degrees of elevational variations about such average elevation in order to obtain a particular linear feature pattern;

identifying and classifying the segmentized for extracting particular features including localized elevational jumps as pattern boundaries for purposes of classifying geometric dimensions of particular objects across which the craft flies, further for identifying persistent uniformities in elevational data as between such boundaries; and determining the position of the craft by correlating a plurality of said particular features and their length extension as between ascertained boundaries on the basis of elevational uniformity with corresponding stored reference information in order to provide a maximum fit that is indicative of deviation of the flight from a landing path as identified by the reference information.

4. Method of landing and landing assist for aircraft under utilization of sensor signal processing stage and a reference stage comprising the steps, providing ahead of a runway, distinctive elevational data and signature producing items which unambiguously identify a portion of the aircraft vis-a-vis the runway;

using a sensor to measure and determine a high resolution pattern corresponding to said provided items being arranged for acquiring an elevational profile of overflight in a landing path ahead of the runway;

segmentizing the measuring data; classifying the segmentized data in accordance with specific variables; and ascertaining the position of the craft vis-a-vis reference data by segment-for-segment comparing certain transitions as far as topographic features are concerned with corresponding patterns of reference information.

5. Method as in claim 4 including using, ahead of a runway, distinctive elevational data and signature producing items which unambiguously identify a portion of the aircraft vis-a-vis the runway.

6. Method of using an apparatus for navigation and updating of navigation for aircraft as it approaches a runway, under utilization of sensor image processing and a reference store, for landing or landing assist comprising:

using a scanning sensor including a circuit to obtain a two dimensional range image of a portion of overflight territory, the image being composed of image points each being represented by a brightness value corresponding to the distance of the craft from the respective territory point represented by the respective image point;

segmentizing the image data in order to obtain a particular two dimensional feature pattern identifying particular types of objects across which the craft flies as it approaches the runway, in terms of range/brightness information including information between neighboring image points in transverse direction as well as in the direction of flight;

extracting particular features including localized elevational jumps from the segmentized data for purposes of classifying particular objects across which the craft flies; and determining the position of the craft in relation to the runway by correlating a plurality of features and their spatial orientation to each other as extracted with corresponding stored reference information in order to provide a maximum fit that is indicative of deviation of the flight from a flight path as identified by the reference information.

7. Method for navigating an aircraft towards a runway under utilization of a sensor, a signal processing stage and a reference stage, including using the sensor to measure and determine at a high resolution data representing an elevational profile of overflight by linearly scanning across a flight path, the improvement for a landing and landing assist operation comprising;

Segmentizing the measuring data by detecting persistence of elevational scanning data patterns over certain lengths of scanning and by detecting boundaries of these data patterns, different elevational patterns differ by changes in average elevation and by degrees of elevational variations about such average elevation;

detecting specifically coordinate values in these boundaries as indication for length values wherein the average elevation pattern remains uniform, the boundaries constituting patterns of segmentation of the measuring data;

identifying and classifying the segments in accordance with variables pertaining to and identifying different persistent at uniform patterns, in that different patterns in elevational data persisting for certain lengths of scanning, are bounded by said boundaries, so that together with the patterns of such boundaries there result identification of elevational patterns as persisting between pairs of boundaries; and ascertaining the position of the craft vis-a-vis reference data by comparing boundary patterns for identifying elevational pattern features are concerned with corresponding boundary patterns of reference information.

* * * * *